(12) United States Patent
Iwaki (10) Patent No.: US 6,739,516 B2
(45) Date of Patent: May 25, 2004

(54) DISTANCE INFORMATION ACQUISITION APPARATUS OR SYSTEM, PATTERN PROJECTOR, AND DISTANCE INFORMATION ACQUISITION METHOD

(75) Inventor: Hidekazu Iwaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 156 days.

(21) Appl. No.: 10/102,121

(22) Filed: Mar. 20, 2002

(65) Prior Publication Data

US 2002/0134839 A1 Sep. 26, 2002

(30) Foreign Application Priority Data

Mar. 23, 2001 (JP) ........................................ 2001-086158

(51) Int. Cl.[7] .............................................. G06K 19/06
(52) U.S. Cl. ........................................ 235/494; 235/454
(58) Field of Search ................................ 235/454, 494, 235/462.22, 462.23, 462.24; 382/106, 181, 165, 170

(56) References Cited

U.S. PATENT DOCUMENTS

| | | | | |
|---|---|---|---|---|
| 5,003,166 A | * | 3/1991 | Girod | 250/201.4 |
| 6,336,587 B1 | * | 1/2002 | He et al. | 235/462.45 |
| 6,340,114 B1 | * | 1/2002 | Correa et al. | 235/462.22 |
| 6,407,802 B1 | * | 6/2002 | Nonaka | 356/3.08 |

OTHER PUBLICATIONS

Trucco, E., et al., "Introductory Techniques for 3–D Computer Vision", Prentice–Hall, New Jersey, USA, 1998.

Asano, H., et al., "Measurement of Three Dimensional Objects Using Gray Code Projection (2nd Report)—Improvement of Reliability of Space Encoding Method", Journal of Japan Society for Precision Engineering, vol. 62, No. 6, 1996 (Japan), pp. 830–834.

Yonezawa, S., et al., "Coded Grating Method for Measuring Three Dimensional Object", Treatise Collection by Institute of Electronics and Communication Engineers of Japan, vol. J61–D, No. 6, Jun. 1978 (Japan), pp. 411–418.

\* cited by examiner

*Primary Examiner*—Diane I. Lee
*Assistant Examiner*—Lisa M. Caputo
(74) *Attorney, Agent, or Firm*—Scully, Scott, Murphy & Presser (57) ABSTRACT

A distance information acquisition apparatus uses a pattern projector to project a pattern onto an imaging object as a ranging object and obtains distance information from an image captured by an image capturing apparatus. The pattern is formed by combining sub-patterns, each sub-pattern comprising at least three types of pattern segments having optically identifiable characteristics. A computer determines which pattern segment in a captured image belongs to which sub-pattern in the pattern based on optical characteristics and position coordinates of that pattern segment in the captured image. A specification result is used to find distance information associated with the imaging object.

21 Claims, 7 Drawing Sheets

DISTANCE INFORMATION ACQUISITION APPARATUS OR SYSTEM, PATTERN PROJECTOR, AND DISTANCE INFORMATION ACQUISITION METHOD

CROSS-REFERENCE TO RELATED APPLICATIONS

This application is based upon and claims the benefit of priority from the prior Japanese Patent Application No. 2001-086158, filed Mar. 23, 2001, the entire contents of which are incorporated herein by reference.

BACKGROUND OF THE INVENTION

1. Field of the Invention

The present invention relates to a distance information acquisition apparatus or system, a distance information acquisition method, and a pattern projector used for these configured to capture an image of an object onto which a specified pattern is projected, to analyze the captured image, and to acquire information on the distance to the object.

2. Description of the Related Art

As a conventional method of measuring the distance to an object to be measured, there is known a pattern projection method of projecting a non-repetitive pattern onto the object to be measured. This method acquires a 3-D (three-dimensional) shape by means of pattern projection.

Figure 1:
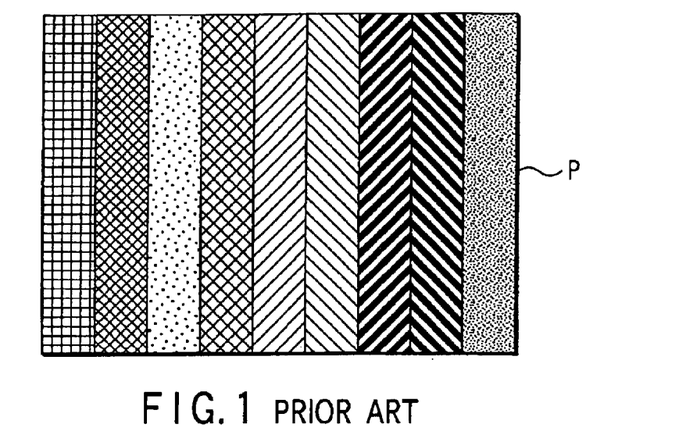
FIG. 1 shows a conventional pattern.

According to this method, a projector projects a specified pattern onto an object to be measured. An image capturing element (camera) captures that image. A computer analyzes this image to obtain 3-D data for the object, i.e., distance information to each part of the object. More specifically, pattern P as shown in FIG. 1 is printed on a film. The pattern P is projected by placing this film between the projector's lighting optical system including a light source and the object. In this example, pattern P comprises nine pattern segments. The hatching in FIG. 1 shows that the respective pattern segments differ from each other in optical characteristics such as colors, gradations, designs, etc.

The need for more accurately measuring distances to more parts increases the number of pattern segments (the number of stripes in this example) in a projection pattern. In addition, many halftones (colors) need to be used.

As mentioned above, it is necessary to increase the number of projection pattern elements (pattern segments or stripe designs) in order to increase points for measuring distances and obtain accurate 3-D information (distance information). This decreases the difference in colors or gradations between adjacent pattern segments. Accordingly, the following problems are expected when an image is captured or quantized from an object onto which such a projection pattern is projected.

(1) An attempt to increase the accuracy or resolution necessitates projecting a pattern having fine, many-valued gradations (colors), decreasing a difference between pattern segments. Consequently, a quantization error easily occurs, finally causing a ranging error.

(2) The production of a projection pattern requires improving the accuracy for reproducing color tones or gradations. Accordingly, it is highly possible that manufacturing processes are complicated and the management or calibration becomes difficult.

BRIEF SUMMARY OF THE INVENTION

The present invention has been made in consideration of the foregoing. It is therefore an object of the present invention to provide a distance information acquisition apparatus or system, a pattern projector, and a distance information acquisition method capable of preventing a ranging error, simplifying manufacturing processes, and facilitating the management or calibration.

According to a first aspect of the present invention, there is provided a distance information acquisition apparatus which captures an object with a specified pattern projected, analyzes the captured image, and obtains distance information associated with the object, the apparatus comprising:

a pattern projection module which projects a pattern onto the object, wherein the pattern is formed by combining the element groups (i.e., sub-patterns), each element group (i.e., sub-pattern) comprising at least three types of elements (i.e., pattern segments) having optically identifiable characteristics;

an image capturing module which is placed a specified distance from the pattern projection module and captures the image of an object having the pattern projected; and a correspondence specifying module configured to determine which element (i.e., pattern segment) in a captured image taken by the image capturing modules belongs to which element group (i.e., sub-pattern) in the pattern based on optical characteristics and position coordinates of the element (i.e., pattern segment) in the captured image, wherein a specification result of the correspondence specify module is used to find distance information associated with the object.

According to a second aspect of the present invention, there is provided a pattern projector used for a distance information acquisition apparatus which captures the image of an object with a specified pattern projected, analyzes the captured image, and obtains distance information associated with the object, the projector comprising:

a film having a pattern printed thereon, wherein the pattern is formed by combining the element groups (i.e., sub-patterns), each element group (i.e., sub-pattern) comprising at least three types of elements (i.e., pattern segments) having optically identifiable characteristics; and a pattern projection module configured to project the pattern onto the object.

According to a third aspect of the present invention, there is provided a distance information acquisition method of capturing the image of an object with a specified pattern projected, analyzing the captured image, and obtaining distance information associated with the object, the method comprising:

projecting a pattern onto the object, wherein the pattern is formed by combining the element groups (i.e. sub-patterns), each element group (i.e., sub-pattern) comprising at least three types of elements (i.e., pattern segments) having optically identifiable characteristics;

capturing the image of the object having the pattern projected thereon by an image capturing module placed with a specified distance from a pattern projection module configured to project the pattern;

determining which element (e.g., pattern segments) in a captured image taken by the image captured module belongs to which element group (e.g., sub-pattern) in the pattern based on optical characteristics and position coordinates of the element in the captured image; and using the specify result to find distance information associated with the object.

According to a fourth aspect of the present invention, there is provided a distance information acquisition apparatus or system which captures the image of an object with a specified pattern projected, analyzes the captured image, and obtains distance information associated with the object, the apparatus or system comprising:

a pattern projection module which projects a pattern onto an object, wherein the pattern comprises at least three types of elements (i.e., pattern segments) having optically identifiable characteristics and includes a plurality of the elements (i.e., pattern segments) of at least one type;

an image capturing module which is placed with a specified distance from the pattern projection module and captures the image of an object having the pattern projected; and a correspondence specifying module configured to determine which element (i.e., pattern segment) in a captured image taken by the image capturing module corresponds to which element (i.e., pattern segment) in the pattern based on optical characteristics and position coordinates of the element (i.e., pattern segment) in the captured image, wherein when the pattern is projected onto a plane including a farthest ranging limit, a distance from an occurrence of one of the plurality of elements (i.e., pattern segments) to a point just before the next occurrence of an element (i.e., pattern segment) of the same type is greater than or equal to a minimum value determined on the basis of a distance measuring range.

In the above-mentioned first to fourth aspects, the above-mentioned pattern is formed by arranging the above-mentioned elements (i.e., pattern segments) along the direction of a baseline which links the above-mentioned pattern projection module and the above-mentioned image capturing module, and by repeating the above-mentioned element group (i.e., sub-pattern).

The above-mentioned pattern may be configured to provide part of the above-mentioned element group (i.e., sub-pattern) with marks for specifying respective element groups (i.e., sub-patterns).

Alternatively, the above-mentioned pattern may be configured by arranging the above-mentioned elements (i.e., pattern segments) along the direction of a baseline which links the above-mentioned pattern projection module and the above-mentioned image capturing module, and by comprising element groups (i.e., sub-patterns) with a plurality of different characteristics.

The above-mentioned pattern may be projected onto a plane equivalent to the farthest measuring limit of the above-mentioned distance information acquisition apparatus. In this case, the width of the above-mentioned element group (i.e., sub-pattern) should be larger than or equal to a minimum width determined by a measurable range (i.e., from the nearest ranging limit to the farthest ranging limit).

Moreover, the above-mentioned pattern may be projected onto a plane equivalent to the farthest ranging limit of the above-mentioned distance information acquisition apparatus. In this case, it may be preferable to further provide a change module configured to change the width of the above-mentioned element group (i.e., sub-pattern) according to a measurable range (i.e., from the nearest ranging limit to the farthest ranging limit).

The above-mentioned element group (i.e., sub-pattern) preferably comprises high-brightness and high-saturation colors.

As mentioned above, the present invention can increase a difference between pattern segments by repetitively using sub-patterns. It is possible to suppress occurrence of a quantization error due to the use of many halftones as conventionally practiced and to prevent a ranging error due to erratic detection of codes.

It is possible to minimize the sub-pattern width and the number of sub-pattern repetitions. This can accurately measure distances with the minimum number of codes (e.g., the number of gradations or colors) by suppressing erratic detection of codes.

Since the number of gradations or colors decreases, pattern generation means (i.e., film having a pattern printed thereon) can be manufactured easily.

Furthermore, since the number of gradations or colors decreases, it is possible to decrease the amount of computation for a computer as a control and analysis apparatus. Fast processing can be expected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described in further detail with reference to the accompanying drawings.

[First Embodiment]

Figure 2A:
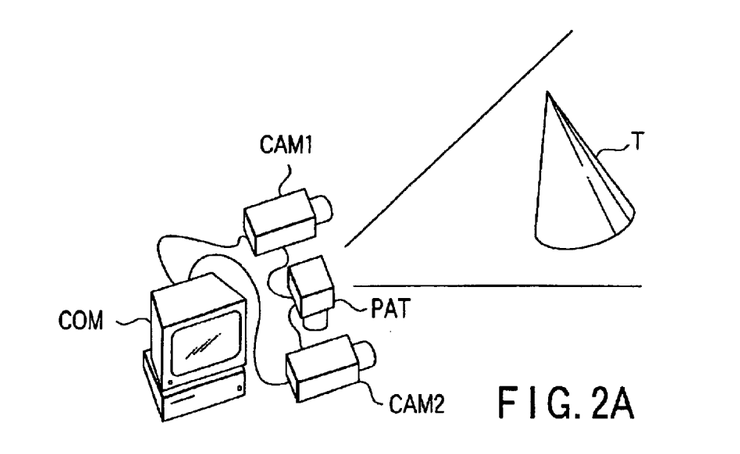
FIG. 2A shows a configuration of a distance information acquisition apparatus according to a first embodiment of the present invention.

FIG. 2A shows a distance information acquisition apparatus according to the first embodiment of the present invention. The distance information acquisition apparatus comprises a pattern projector PAT, image capturing apparatuses CAM1 and CAM2, and a computer COM. The pattern projector PAT projects a pattern onto an object T. The image capturing apparatuses CAM1 and CAM2 capture an image for the object T where the pattern is projected. The computer COM controls the above-mentioned image capturing apparatuses CAM1 and CAM2 and the pattern projector PAT, and computes distance information associated with the object T by analyzing the captured image. The pattern projector PAT is configured to project a pattern by placing a pattern-printed film (not shown) between a pattern projection module (not shown) and the object T. The pattern projection module includes a light source and a lighting optical system.

On the distance information acquisition apparatus having this configuration, the computer COM sends a ranging start signal. Alternatively, an operator turns on an image capturing start switch (not shown) of the image capturing apparatus CAM1 (CAM2). This allows the pattern projector PAT to start projecting a pattern. The image capturing apparatus CAM1 (CAM2) captures a pattern-projected image at least once. The image is transferred from the image capturing apparatus CAM1 (CAM2) to the computer COM. The computer COM analyzes this image and computes distances to respective parts of the object T to complete acquisition of 3-D (three-dimensional) data.

The embodiment uses two image capturing apparatuses in consideration of application to a hybrid system, accuracy improvement, etc. Of course, the use of one image capturing apparatus can provide the same effect. The above-mentioned hybrid system means a combination of the "pattern projection" described in the present invention and a passive stereo technology, etc. For example, the passive stereo technology detects corresponding points between images captured from a plurality of viewpoints and measures distances based on the detected deviation amounts.

For simplicity of discussion herein, one image capturing apparatus (e.g., CAM2) is used for image capturing.

Figure 2B:
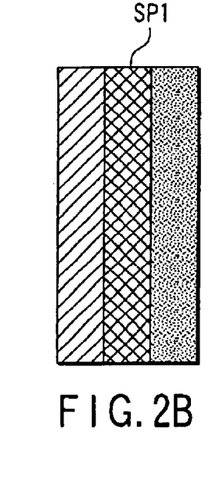
FIG. 2B shows a sub-pattern according to the first embodiment.
Figure 2C:
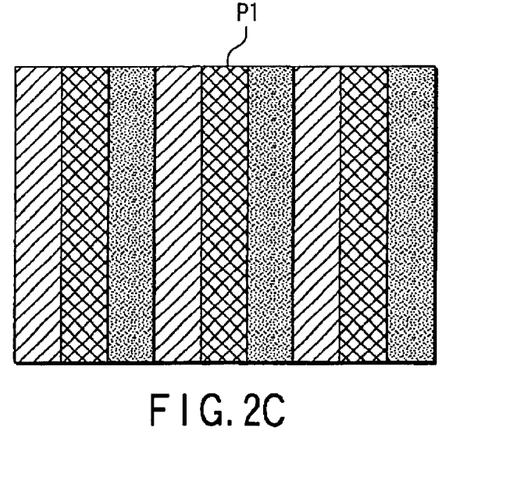
FIG. 2C shows a pattern according to the first embodiment.

Referring now to FIGS. 2B and 2C, the following describes in detail a pattern to be projected for obtaining the distance information. Actually, there is used a film where such pattern is printed so that the pattern can be projected.

As shown in FIG. 2B, three pattern segments are used to configure a sub-pattern SP1. As shown in FIG. 2C, three sub-patterns SP1 are used to form a pattern P1. In this case, respective pattern segments in the formed pattern P1 are arranged parallel to the direction of a baseline define by the pattern projector PAT and the image capturing apparatus CAM2.

While a conventional distance information acquisition apparatus needs nine gradations (colors) arranged in the baseline direction, this embodiment just needs three gradations (colors).

As will be described later, the width of the sub-pattern SP1 as shown in FIG. 2B needs to be set based on a distance measuring range (from the nearest ranging limit to the farthest ranging limit).

Figure 3:
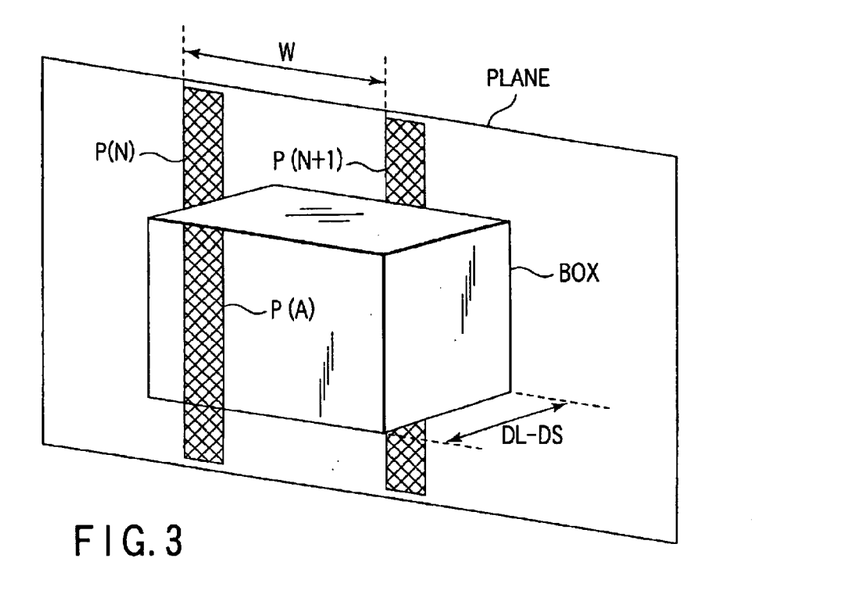
FIG. 3 illustrates correlation between a distance measuring range and a sub-pattern width.

With reference to FIG. 3, the following describes a correlation between the distance measuring range and a sub-pattern width, i.e., a length from an occurrence of one pattern segment to a point just before the next occurrence of the same pattern segment. Here, a farthest ranging limit DL denotes the farthest position the distance information acquisition apparatus can measure. Similarly, a nearest ranging limit DS denotes the nearest position the distance information acquisition apparatus can measure. Assuming these positions to be the farthest ranging limit DL and the nearest ranging limit DS, FIG. 3 shows that a rectangular parallelepiped BOX having a thickness of DL-DS exists on a plane equivalent to the farthest ranging limit DL. The plane is hereafter referred to as a farthest ranging limit PLANE.

In this state, when the pattern P1 is projected onto the above-mentioned farthest ranging limit PLANE, a symbol W corresponds to a width of the sub-pattern SP1 constituting the pattern P1. Here, P(N) is the leftmost pattern segment belonging to the Nth sub-pattern from the left. Similarly, P(N+1) represents the leftmost pattern segment belonging to the (N+1)th sub-pattern. Accordingly, both the pattern segments P(N) and P(N+1) have the same optical characteristics.

FIG. 3 shows a case where the pattern segment P(A) in the captured image horizontally (i.e., X direction) corresponds to the pattern segment P(N) projected on to the farthest ranging limit PLANE. In this case, it is difficult to determine whether the pattern segment P(A) corresponds to the pattern segment P(N) or P(N+1). In other words, it is necessary to appropriately select the distance measuring range (DL-DS) and the width W of the sub-pattern SP1. Otherwise, it is not easy to determine whether the pattern segment P(A) matches "the pattern segment P(N+1) projected onto an object at the nearest ranging limit DS" or "the pattern segment P(N) projected onto an object at the farthest ranging limit DL". Conversely, setting the width of the sub-pattern SP1 to W or larger can prevent the pattern segment P(N+1) from overlapping with the pattern segment P(N) projected onto the farthest ranging limit PLANE within the captured image.

Accordingly, it is necessary to compute an appropriate width W for the sub-pattern SP1.

Figure 4A:
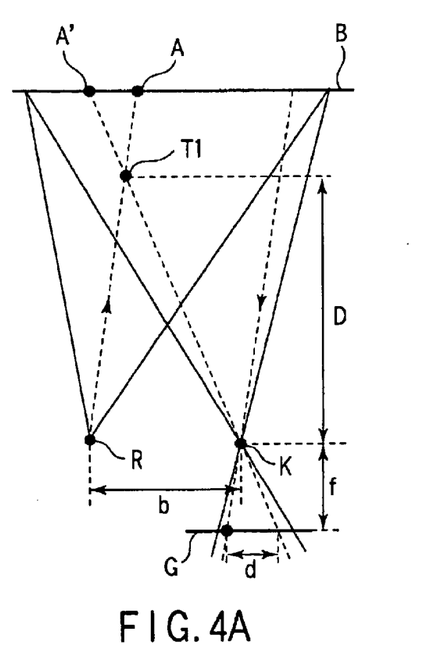
FIG. 4A schematically shows a system for the pattern projection method.
Figure 4B:
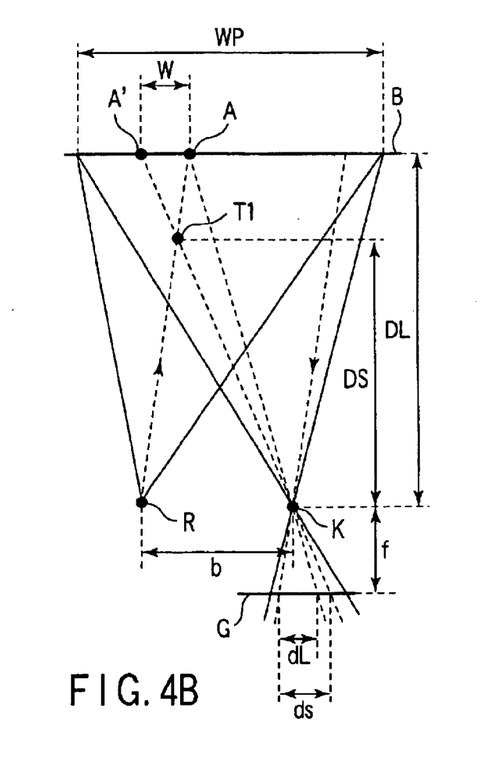
FIG. 4B illustrates how to set a sub-pattern width.

Referring now to FIGS. 4A and 4B, the following describes how to set the width W for the sub-pattern SP1. The following description assumes that the pattern projection module uses a point light source; no lens, etc., is used for image formation, and the image capturing module is a pinhole camera. The detailed description of an actual system is described in the book "Introductory Techniques for 3-D Computer Vision" (Emanuele Trucco, Alessandro Verri, Prentice-Hall, N.J., USA, 1998), for example. The description thereof is omitted here.

FIG. 4A schematically depicts a pattern projection system. The system comprises a light source R for the pattern projection module, a pinhole K for the image captured module, an objects B and T1, and an image plane G. This figure shows that the object T1 is present. If the object T1 does not exist, a pattern segment A is captured at a deviated position A' which should be point A on the object B.

First, assuming that the above-mentioned object B is at infinity, pattern recognition is used to find a deviation amount (hereafter referred to as parallax) d on the image plane G of the pattern segment. A distance from the pinhole K to the image plane G is represented by f. A baseline length is represented by b. Then, the following relation applies to a distance D from the pinhole K to the object T1.

$$d/f = b/D$$

The distance D can be found as follows.

$$D = fb/d \quad (1)$$

Under the conditions of FIG. 4B, the following equations can be derived.

Namely, the above-mentioned equation (1) can be modified to find the parallax dS for the nearest ranging limit DS to the object T1 and the parallax dL for the farthest ranging limit DL thereto as follows.

$$dS = fb/DS \quad (2)$$

$$dL = fb/DL \quad (3)$$

The minimum width W (distance A–A' in FIG. 4B) of the sub-pattern SP1 can be found as follows by using the shortest distance (nearest ranging limit DS) to the object T1 and the longest distance (farthest ranging limit DL) thereto.

$$W = DL/f(dS - dL) = b(DL/DS - 1) \quad (4)$$

Three parameters are available: the baseline length b, the farthest ranging limit DL, and the nearest ranging limit DS. When these parameters are known, it is possible to estimate a minimum sub-pattern width when the pattern P1 is projected onto the farthest ranging limit DL. When the width of the sub-pattern SP1 is set to this value or greater, the state in FIG. 3 does not occur. There is no problem in repeatedly using pattern segments having the same optical characteristics.

The embodiment specifies the minimum width W for the sub-pattern SP1 in the projected pattern P1 by using the farthest ranging limit DL and the nearest ranging limit DS. Because of the similarity, this is the same as specifying a minimum width of the sub-pattern on a pattern-printed film by using the above-mentioned parallaxes dS and dL.

Suppose that the minimum sub-pattern width W has been thus estimated when the pattern P1 is projected onto the farthest ranging limit DL. Then, the number of repetitions N for the sub-pattern SP1 is found, as follows, on the assumption that WP denotes an entire pattern's width required on the farthest ranging limit PLANE.

$$N \leq WP/W \quad (5)$$

The pattern P1 in FIG. 2C just needs to be designed based on these parameters, i.e., the sub-pattern width W and the number of repetitions N.

The following describes how to specify the correspondence between each pattern segment on the captured image and each pattern segment in the projected pattern when the repetitive sub-pattern SP1 in the embodiment is used. The process is described with reference to FIG. 5 when the pattern projector PAT is placed to the left of the image capturing apparatus CAM2. Based on the same concept, the process is also applicable when the pattern projector PAT is placed to the right thereof.

Figure 5:
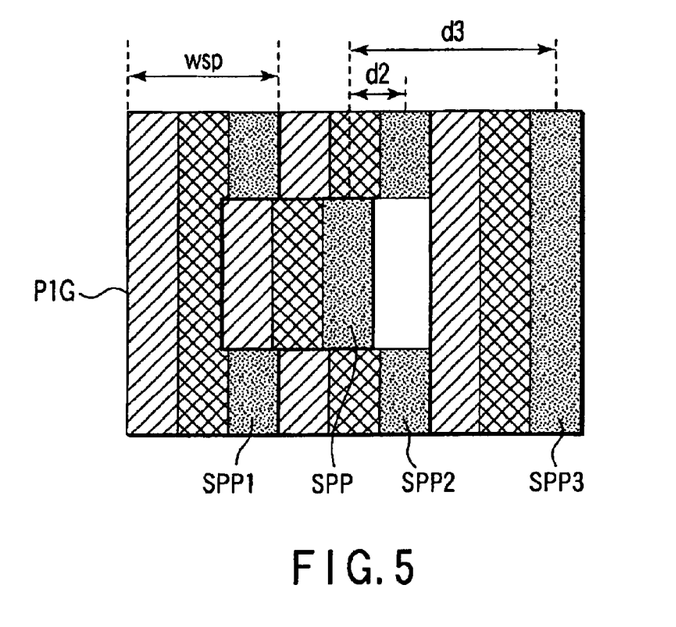
FIG. 5 schematically shows an image captured when a square object exists in a distance measuring range.

FIG. 5 schematically shows a captured image P1G when a rectangular object exists at a position equivalent to SPP in the distance measuring range. The image P1G is a pattern image obtained by capturing the pattern P1 projected onto the farthest ranging limit PLANE. Under this condition, the process is performed as follows:

(1) Suppose that the pattern P1 is projected onto an object at infinity (farthest ranging limit DL) by means of camera calibration. Find coordinates for pattern segments (SPP1, SPP2, and SPP3 in the figure) of an image to be captured. These coordinates are hereafter referred to as reference pattern segment coordinates. At the same time, store a sub-pattern width wsp. Here, a pattern segment coordinate means a horizontal coordinate on the image at the horizontal center of the pattern segment, for example. Since the sub-pattern SP1 is repeated, one type of pattern segment can yield the reference pattern segment coordinate having the number of repetitions N.

(2) Then, identify the pattern segment coordinate for the pattern segment (SPP in the figure) in the captured image P1G.

(3) Compare the reference pattern segment coordinate corresponding to each pattern segment with the pattern segment coordinate found at step (2) above to find a difference. In this example, there are found differences d2 and d3 based on the reference pattern segment coordinates to the right. Of these differences, assume a value smaller than the stored sub-pattern width wsp to be a parallax. In the figure, d2 is assumed to be a parallax. Namely, it is determined that SPP in the captured image P1G corresponds to SPP2.

According to the first embodiment as mentioned above, the sub-pattern SP1 comprises three pattern segments having optically identifiable characteristics. Three sub-patterns SP1 are combined to form the pattern P1. The pattern P1 is used to project pattern segments on the object T. Based on optical characteristics and position coordinates of these pattern segments in the captured image P1G, a correspondence is made between each of the pattern segments in the above-mentioned captured image P1G and the sub-pattern SP1 in the pattern P1. The result is used to find distance information associated with the object T. This can provide large differences between pattern segments. Accordingly, it is possible to suppress occurrence of a quantization error due to the use of many halftones as conventionally practiced and to prevent a ranging error.

It is expected to moderate the accuracy of pattern projectors or accuracy requirements for pattern generation means such as pattern masks (filters, films, etc.), and simply manufacturing processes.

Furthermore, since pattern segment types are fewer than the prior art, it is possible to decrease the amount of computation for the computer COM and provide fast processing.

In the figures, the sub-pattern is enclosed in a thick black frame for distinction in the pattern P1. Actually, the frame may or may not be provided.

In the figures, each pattern segment in the pattern is provided with the hatching or coloring for the sake of convenience in order to clarify the function. In practice, this indicates that respective pattern segments are provided with optically identifiable treatments such as colors, gradations, designs, etc., for distinction between the pattern segments.

The same considerations about the black frame, hatching, etc. apply to the other embodiments described below.

[Second Embodiment]

The following describes the second embodiment of the present invention.

The second embodiment provides an example of a repetitive sub-pattern comprising a plurality of simple gradations.

Figure 6A:
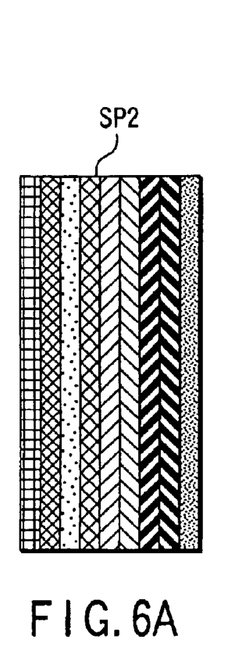
FIG. 6A shows a sub-pattern according to a second embodiment of the present invention.
Figure 6B:
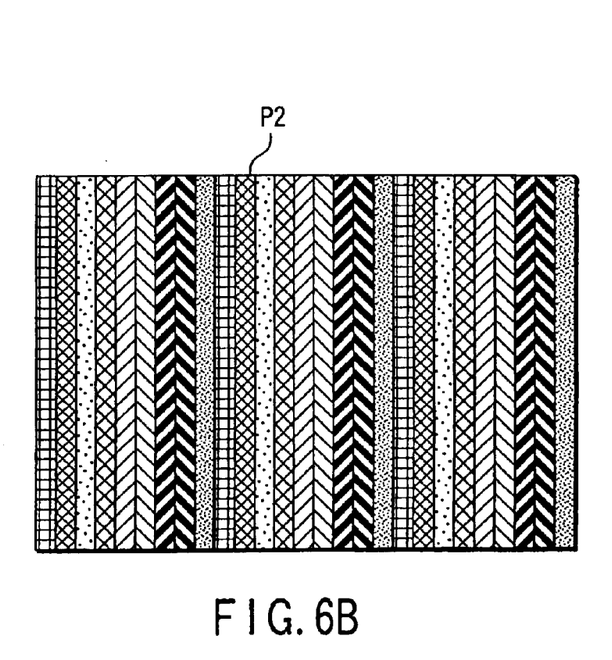
FIG. 6B shows a pattern according to the second embodiment.

The concept is the same as the above-mentioned first embodiment. For improving the ranging accuracy, however, a sub-pattern SP2 comprises nine pattern segments as shown in FIG. 6A. As shown in FIG. 6B, three sub-patterns SP2 are used to form a pattern P2 to be used for projection.

It is obvious that the configuration reduces the number of pattern segments to nine gradations (colors), i.e., one third of the conventional 27 gradations (colors).

Colors or gradations may be arranged according to a rule that the difference between adjacent pattern segments is as long as possible in terms of brightness or saturation therebetween. When pattern segments comprise nine gradations, for example, the pattern segments may be preferably arranged in a sequence of the fifth, the ninth, the fourth, the eighth, the third, the seventh, the second, the sixth, and the first gradations. The adjacent pattern segments provide a difference of three or four gradations. The decreases the number of gradations and improves resistance to a quantization error. In total, the optical signal difference is improved at least nine times (3×3).

It is preferable to apply the rule of arranging colors or gradations to the above-mentioned embodiment and the other embodiments to be described later.

[Third Embodiment]

The third embodiment of the present invention is described hereinafter.

Figure 7A:
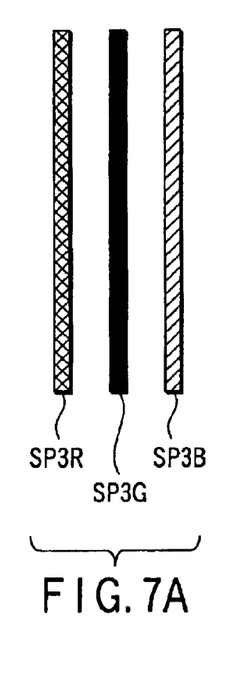
FIG. 7A shows pattern segment elements according to a third embodiment of the present invention.
Figure 7B:
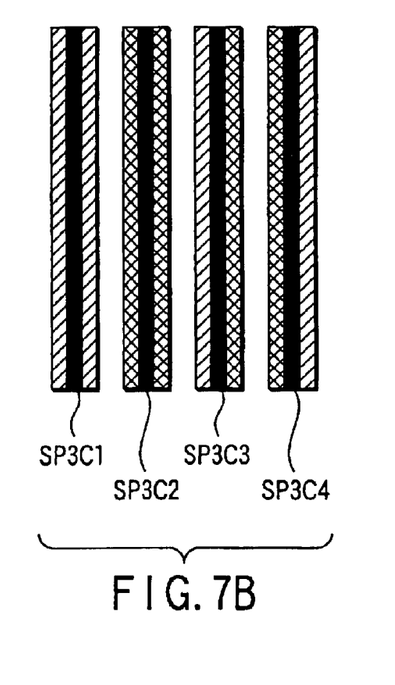
FIG. 7B shows coded pattern segments according to the third embodiment.
Figures 7C, 7D:
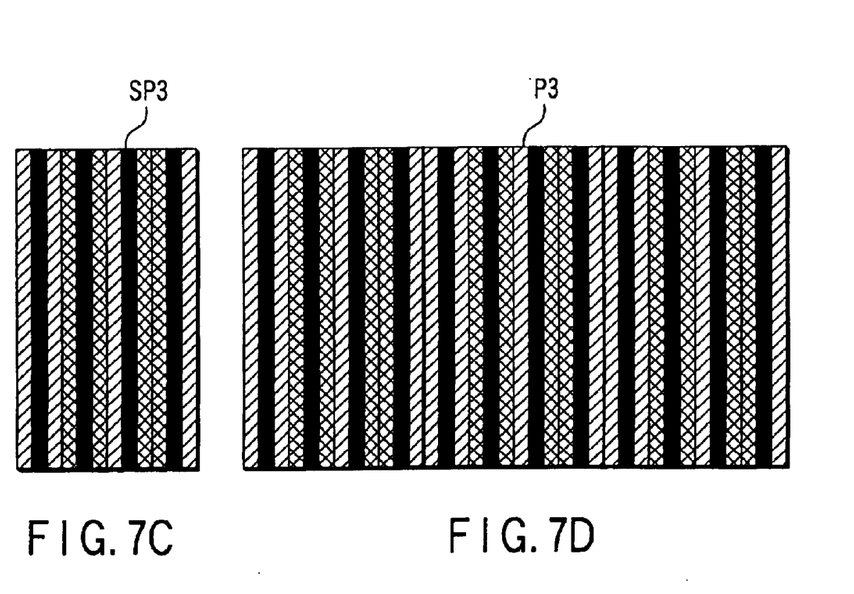
FIG. 7C shows a sub-pattern according to the third embodiment.
FIG. 7D shows a pattern according to the third embodiment.

As shown in FIGS. 7A through 7D, the third embodiment creates a coded pattern segment using three gradations. The coded pattern segment here uses three pattern segment elements SP3R, SP3G, and SP3B as shown in FIG. 7A. As shown in FIG. 7B, the coded pattern segments are formed by sandwiching a pattern segment element (green) SP3G between pattern segment elements (red) SP3R, between pattern segment elements (blue) SP3B, or between SP3R and SP3B. It is possible to configure four types of coded pattern segments SP3C1, SP3C2, SP3C3, and SP3C4 by using combinations of pattern segment elements SP3R and SP3B placed to both sides of the pattern segment element SP3G. These coded pattern segments SP3C1, SP3C2, SP3C3, and SP3C4 are used to form a sub-pattern SP3 as shown in FIG. 7C and a pattern P3 as shown in FIG. 7D.

When these coded pattern segments are used, the coded pattern segment element SP3G is first detected. The code can be uniquely recognized by identifying colors or gradations on both sides thereof.

Since the recognition procedure first detects the coded pattern segment element SP3G, the coded pattern segment element SP3G is centered on the coded pattern segment. If the recognition procedure is based on another color or gradation, the coded pattern segment element of its color or gradation is centered on the coded pattern segment.

Obviously, it is expected that the use of such coded pattern segment can also provide the same effects as for the above-mentioned first embodiment.

The embodiment differs from the other embodiments in that four types of pattern segments can be represented just by using three gradations.

[Fourth Embodiment]

The fourth embodiment of the present invention is described hereinafter.

The fourth embodiment provides an example of a repetitive sub-pattern arranged in a two-dimensional array.

Figure 8A:
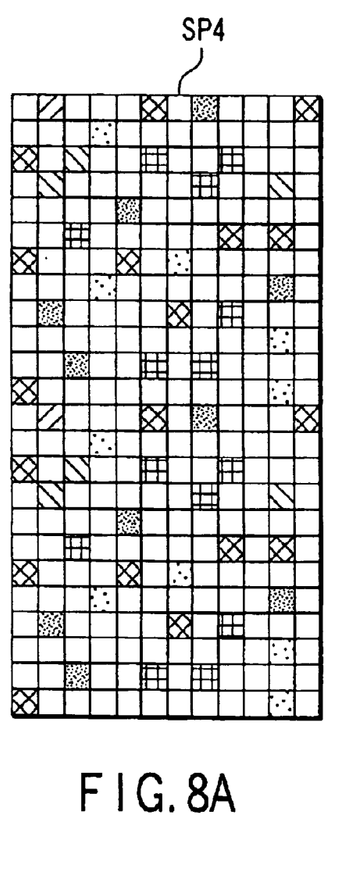
FIG. 8A shows a sub-pattern according to a fourth embodiment of the present invention.
Figure 8B:
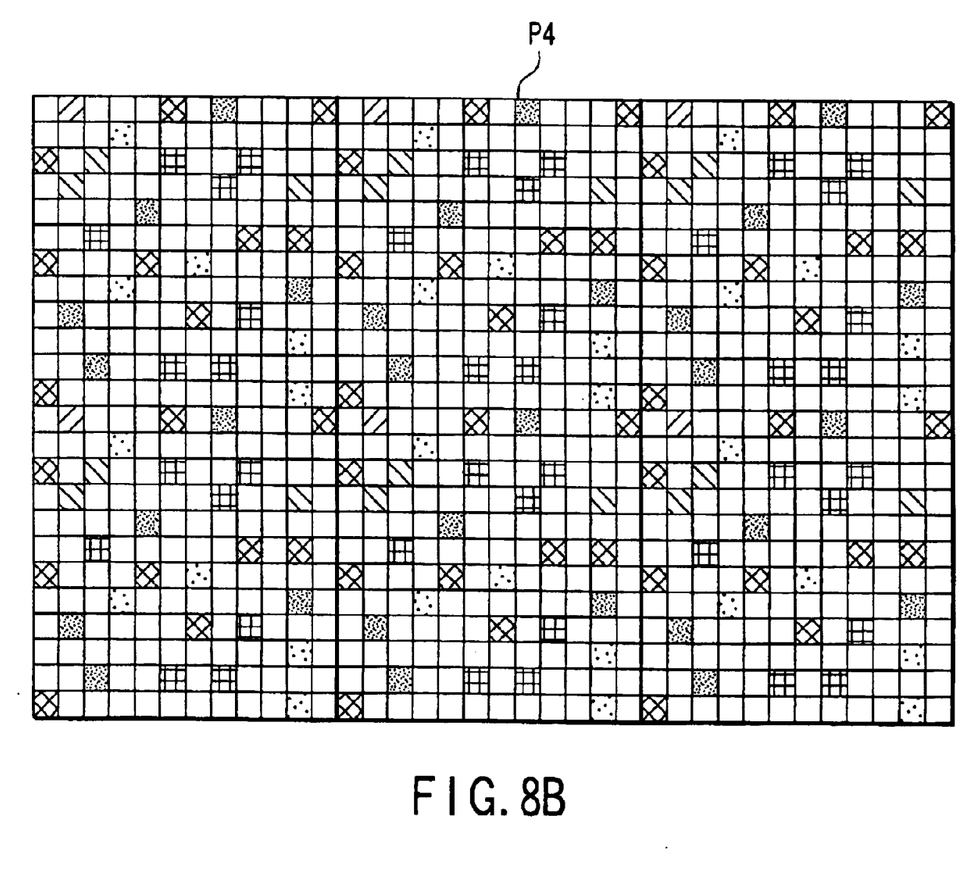
FIG. 8B shows a pattern according to the fourth embodiment.

As shown in FIG. 8A, a sub-pattern SP4 in a two-dimensional array uses pattern segments having colors or gradations arranged in different sequences. Three sub-patterns SP4 are used to form a pattern P4 used for projection as shown in FIG. 8B.

Such two-dimensional arrangement makes it possible to expect the same effects as the other embodiments.

When a pattern segment uses a single color like the other embodiments, if the same color is used for the object T and the pattern segment, the measurement is impossible on that pattern segment. By contrast, the two-dimensional arrangement like the embodiment can prevent such unmeasurable portions from occurring.

Colors or gradations may be arranged so that adjacent pattern segments cause as large a difference as possible in brightness or saturation therebetween.

[Fifth Embodiment]

The fifth embodiment of the present invention is described hereinafter.

The fifth embodiment projects a pattern with high brightness and saturation.

Namely, a projected pattern should be of high brightness and saturation.

When a projector is used, for example, a pattern-printed monochromatic film is placed in front of the light source. The transmitted light is projected onto an object. On such projector, it is effective to provide the film with a minimum transmittance of 25% or higher, or more preferably, 50% or higher. This is proved experimentally. When the pattern brightness has 256 gradations, it is preferable to use 128 gradations or more.

With respect to the high saturation in this case, there are various spaces for representing colors. For example, each of RGB has 256 gradations in an RGB space. The high saturation then means 100 or more when the saturation is defined with a distance from a straight line in the direction of (1.1.1) passing through the origin in the RGB space.

When the projected pattern has high brightness or saturation, a sharp pattern obviously results inside the captured image. This can improve an immunity to noise inside and outside the system. It is expected to reduce the amount of light for a light source.

[Sixth Embodiment]

The sixth embodiment of the present invention is described hereinafter.

The sixth embodiment is a projection pattern partially provided with a position detection mark.

Figure 9A:
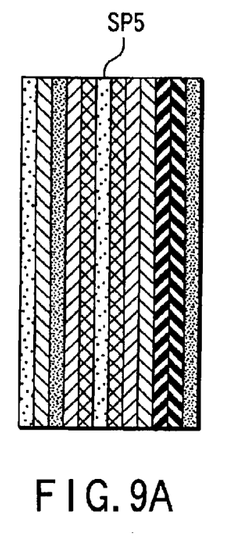
FIG. 9A shows a sub-pattern according to a sixth embodiment of the present invention.
Figure 9B:
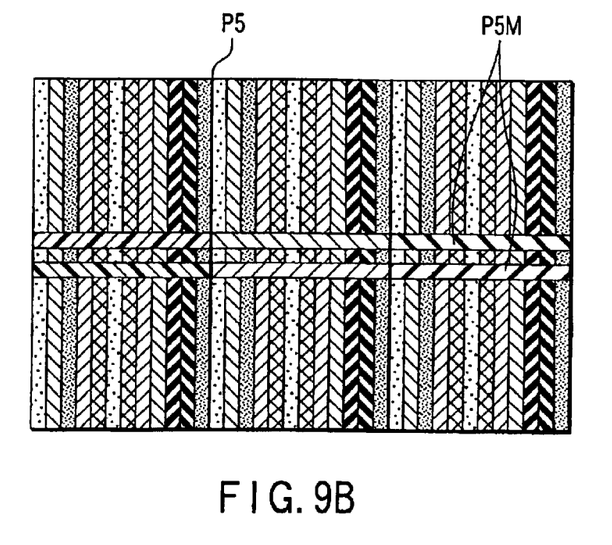
FIG. 9B shows a pattern according to the sixth embodiment.

As shown in FIG. 9A, three sub-patterns SP5 like the above-mentioned second embodiment are used to form a pattern to be used for projection. As shown in FIG. 9B, this embodiment further provides the pattern P5 with a mark (design) P5M which differs from each sub-pattern in the horizontal direction, for example. The mark is used for uniquely identifying each sub-pattern.

When such pattern P5 is used, it is possible to determine that a particular pattern segment belongs to which sub-pattern SP5 by confirming the above-mentioned mark P5M. Even if an object exists outside the distance measuring range, it is possible to determine that the object is located outside an allowable distance range by checking around the mark P5M. When an image is captured as shown in FIG. 3, the use of the mark P5M makes it possible to detect that the object T exists outside the measurable range.

The mark P5M may be positioned at either end instead of at the center as shown in FIG. 9B.

[Seventh Embodiment]

The seventh embodiment of the present invention is described hereinafter.

The seventh embodiment optimizes the above-mentioned minimum sub-pattern width W and the number of sub-pattern repetitions N in a repetitive sub-pattern according to a ranging condition.

As mentioned above, the distance measuring range (DL-DS) and the baseline length b determine the sub-pattern width W and the number of repetitions N. It is expected that an attempt to obtain a wider range of distance measurement increases the sub-pattern width W and decreases the number of repetitions N. A possible solution is to divide the entire distance measuring range into two or three zones and to project a pattern optimized there. For switching between zones, an operator may replace slides for pattern projection. Alternatively, the printed film may be mechanically changed for zones A, B, and C.

A more preferred example is installation of a transmission liquid crystal apparatus instead of mechanical film switching means. A desired signal is applied to the liquid crystal to generate a pattern appropriate for each zone (distance measuring range). Such pattern projector is configured like a so-called liquid crystal projector. The same effect can be expected if the switching operation itself of the printed film may be performed by the computer for analyzing captured images, a control module in the image capturing apparatus, or an operator.

[Eighth Embodiment]

The eighth embodiment of the present invention is described hereinafter.

The eighth embodiment uses a plurality of sub-patterns.

Figure 10A:
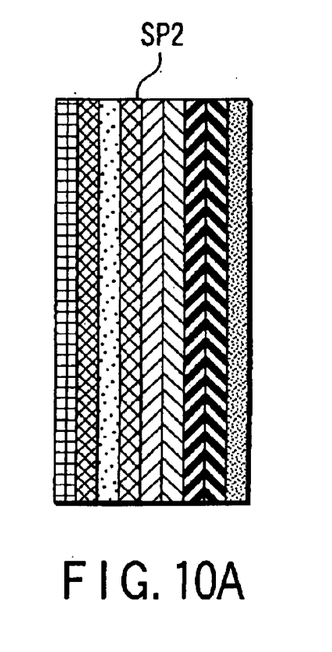
FIGS. 10A and 10B show sub-patterns according to an eighth embodiment of the present invention.
Figure 10B:
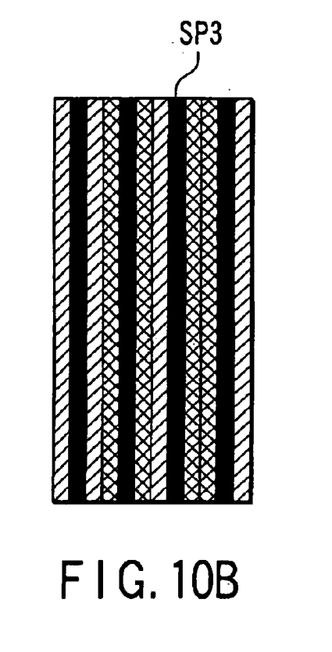
Figure 10C:
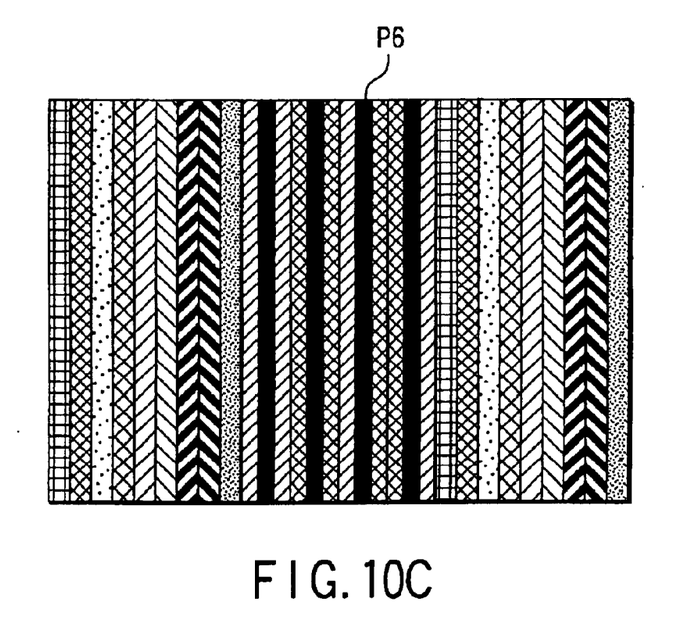
FIG. 10C shows a pattern using these two types of sub-patterns according to the eighth embodiment.

Namely, two types of sub-patterns, i.e., SP2 in FIG. 10A and SP3 in FIG. 10B, are used to configure a pattern P6 as shown in FIG. 10C. In this case, the sub-pattern SP3 is arranged at the center of the pattern P6 and is sandwiched between two sub-patterns SP2. Although pattern segment types increase, this embodiment can expectably provide an effect similar to that of the other embodiments.

It may be known beforehand that the light source provides a partially different light volume or the imaging object T causes partially different brightness or saturation. In this case, the pattern can be more easily recognized by arranging a plurality of sub-patterns in accordance with the light volume or the imaging object T.

Further, a unique sub-pattern is used at the center or the left or right end for providing a special meaning. It is expected to easily locate a pattern segment belonging to the sub-pattern at the center or the left or right end.

[Ninth Embodiment]

The ninth embodiment of the present invention is described hereinafter.

The ninth embodiment provides an example of a sub-pattern, only part of which is repeated.

Figure 11A:
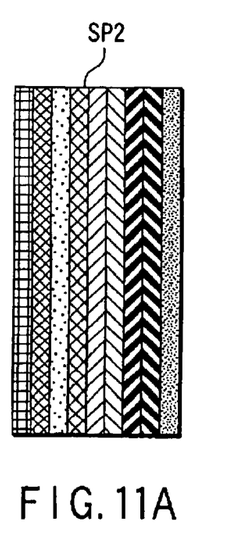
FIG. 11A shows a sub-pattern according to a ninth embodiment of the present invention.
Figure 11B:
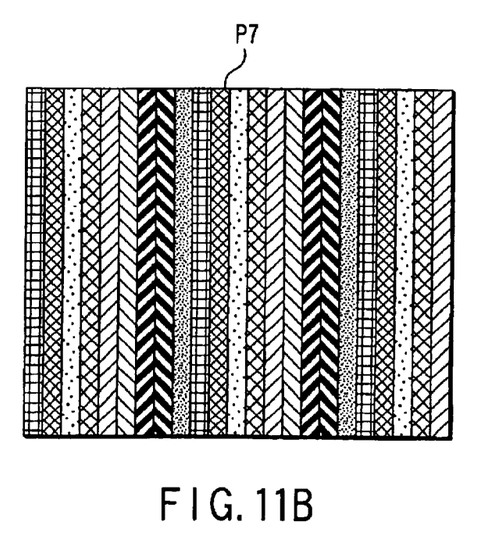
FIG. 11B shows a pattern according to the ninth embodiment.

FIG. 11A shows a sub-pattern SP2. As shown in FIG. 11B, a pattern P7 is formed by repeating the sub-pattern SP2 twice and adding part thereof.

The embodiment can expectably provide the same effects as for the other embodiments. Moreover, a sub-pattern having a given width can be used for any pattern width.

While there have been described specific preferred embodiments of the present invention, it is to be distinctly understood that the present invention is not limited thereto but may be otherwise variously embodied within the spirit and scope of the invention.

For example, the sub-pattern shape is not limited to rectangular, but may be trapezoidal, circular, diamond-shaped, etc.

The sub-pattern may comprise sub-pattern segments arranged not only in a vertical stripe, but also in a sine wave, rectangular wave, triangular wave, etc.

Further, it may be preferable to repeat a partially differing sub-pattern.

The configuration described in the above-mentioned embodiment independently comprises the projector PAT, the image capturing apparatus CAM1 (CAM2), and the computer COM as a control and analysis apparatus. All or part of these apparatuses may be installed in one cabinet.

It is also possible to temporarily store an image of the pattern-projected imaging object T in the image capturing apparatus and batch process that image on an offline computer.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A distance information acquisition apparatus which captures the image of an object with a specified pattern projected, analyzes the captured image, and obtains distance information associated with said object, said apparatus comprising:

a pattern projection module which projects a pattern onto said object, wherein said pattern is formed by combining said element groups, each element group comprising at least three types of elements having optically identifiable characteristics;

an image capturing module which is placed with a specified distance from said pattern projection module and captures the image of an object having said pattern projected; and a correspondence specifying module configured to determine which element in a captured image obtained by said image capturing module belongs to which element group in said pattern based on optical characteristics and position coordinates of said element in the captured image, wherein a specification result of said correspondence specifying module is used to find distance information associated with said object.

2. The apparatus according to claim 1, wherein said pattern is formed by arranging said elements in the direction of a baseline defined by said pattern projection module and said image captured module and by repeating said element group.

3. The apparatus according to claim 2, wherein said pattern is provided with a mark on part of said element group for specifying each element group.

4. The apparatus according to claim 1, wherein said pattern is configured by arranging said elements in the direction of a baseline linking said pattern projection module with said image capturing module and by comprising a plurality of element groups with different characteristics.

5. The apparatus according to claim 1, wherein a width of said element group should be greater than or equal to a minimum width determined by a measurable range when said pattern is projected onto a plane equivalent to a farthest measuring limit of said distance information acquisition apparatus.

6. The apparatus according to claim 5, further comprising:

a change module configured to change a width of said element group according to a measurable range when said pattern is projected onto a plane equivalent to a farthest measuring limit of said distance information acquisition apparatus.

7. A pattern projector used for a distance information acquisition apparatus which captures the image of an object with a specified pattern projected, analyzes the captured image, and obtains distance information associated with said object, said projector comprising:
- a film having a pattern printed thereon, wherein said pattern is formed by combining said element groups, each element group comprising at least three types of elements having optically identifiable characteristics; and
- a pattern projection module configured to project said pattern onto said object.

8. The apparatus according to claim 7, wherein said pattern is formed by repeating said element group.

9. The apparatus according to claim 7, wherein said pattern is provided with a mark on part of said element group for specifying each element group.

10. The apparatus according to claim 7, wherein said pattern comprises a plurality of element groups with different characteristics.

11. The apparatus according to claim 7, wherein:
- when said pattern is projected onto a plane equivalent to a farthest ranging limit of a distance information acquisition apparatus using said pattern projector, a width of said element group should be greater than or equal to a minimum width determined by a measurable range of said distance information acquisition apparatus.

12. The apparatus according to claim 11, further comprising:
- a change module configured to change a width of said element group according to a measurable range of a distance information acquisition apparatus when said pattern is projected onto a plane equivalent to a farthest measuring limit of said distance information acquisition apparatus using said pattern projector.

13. A distance information acquisition method of measuring an object with a specified pattern projected, analyzing the captured image, and obtaining distance information associated with said imaging object, said method comprising:
- projecting a pattern onto said the object, wherein said pattern is formed by combining said element groups, each element group comprising at least three types of elements having optically identifiable characteristics;
- capturing the image of an object having said pattern projected thereon by an image capturing module placed with a specified distance from a pattern projection module configured to project said pattern;
- determining which element in a captured image obtained by said image capturing module belongs to which element group in said pattern based on optical characteristics and position coordinates of said element in the captured image; and
- using said specification result to find distance information associated with said object.

14. The method according to claim 13, wherein said pattern is formed by arranging said elements in the direction of a baseline linking said pattern projection module with said image capturing module and by repeating said element group.

15. The method according to claim 14, wherein said pattern is provided with a mark on part of said element group for specifying each element group.

16. The method according to claim 13, wherein said pattern is configured by arranging said elements in the direction of a baseline linking said pattern projection module with said image capturing module and by comprising a plurality of element groups with different characteristics.

17. The method according to claim 13, wherein a width of said element group should be greater than or equal to a minimum width determined by a measurable range when said pattern is projected onto a plane equivalent to a farthest ranging limit of said distance information acquisition method.

18. The method according to claim 17, wherein a width of said element group is changed according to a measurable range when said pattern is projected onto a plane equivalent to a farthest ranging limit of said distance information acquisition method.

19. The method according to claim 13, wherein said element group comprises high brightness and saturation.

20. A distance information acquisition apparatus which captures an object with a specified pattern projected, analyzes the captures image, and obtains distance information associated with said object, said apparatus comprising:
- a pattern projection module which projects a pattern onto an object, wherein said pattern comprises at least three types of elements having optically identifiable characteristics and includes a plurality of said elements of at least one type;
- an image capturing module which is placed with a specified distance from said pattern projection module and captures the image of an object having said pattern projected; and
- a correspondence specifying module configured to determine which element in a captured image obtained by said image capturing module corresponds to which element in said pattern based on optical characteristics and position coordinates of said element in the captured image, wherein
  - when said pattern is projected onto a plane including a farthest ranging limit, a distance from an occurrence of one of said plurality of elements to a point just before the next occurrence of an element of the same type is greater than or equal to a minimum value determined on the basis of a distance measuring range.

21. A distance information acquisition system which captures an object with a specified pattern projected, analyzes the captured image, and obtains distance information associated with said object, said system comprising:
- a pattern projection module which projects a pattern onto an object, wherein said pattern comprises at least three types of elements having optically identifiable characteristics and includes a plurality of said elements of at least one type;
- an image capturing module which is placed with a specified distance from said pattern projection module and captures the image of an object having said pattern projected; and
- a correspondence specifying module configured to determine which element in a captured image obtained by said image capturing module corresponds to which element in said pattern based on optical characteristics and position coordinates of said element in the capturing image, wherein
  - when said pattern is projected onto a plane including a farthest ranging limit, a distance from an occurrence of one of said plurality of elements to a point just before the next occurrence of an element of the same type is greater than or equal to a minimum value determined on the basis of a distance measuring range.

* * * * *